United States Patent Office 2,792,338
Patented May 14, 1957

2,792,338

SPRAYING OF AN ALUMINUM HALIDE-HYDROCARBON COMPLEX

Morgan W. Davidson and Forrest N. Ruehlen, Bartlesville, Okla., assignors to Phillips Petroleum Company, a corporation of Delaware No Drawing. Application December 29, 1952, Serial No. 328,519

8 Claims. (Cl. 196—54)

This invention relates to spraying of an aluminum halide-hydrocarbon complex, for example, an aluminum chloride-hydrocarbon catalyst complex. In one of its aspects the invention relates to spraying a complex as set forth, by causing it to provide from itself a spray formation assisting gas. In another aspect, the invention relates to spraying a complex, as set forth, in a conventional spraying means without necessarily employing any externally-provided spray formation assisting gas, medium or liquid.

According to this invention there is provided a process for improving the spraying of aluminum halide-hydrocarbon catalyst complex, particularly aluminum chloride and aluminum bromide catalyst complexes, with conventional spray nozzles by heating the catalyst complex to a temperature at which the evolution of free hydrocarbons in the gaseous phase from the catalyst complex assists in the spraying of the catalyst complex. According to the invention the temperature should be in the approximate range 500–650° F.

Aluminum halide-hydrocarbon complex has long been used as a catalyst in alkylation, isomerization and similar processes. During the cource of carrying out these processes the activity of the catalyst complex becomes insufficient to sustain the desired reactions and must be replenished. The withdrawn spent catalyst containing from 50–70 weight percent aluminum halide is usually very viscous, with a viscosity in the range of 50–1500 centistokes at 100° F., and contains dissolved and suspended hydrocarbons and dissolved hydrogen chloride. The discard of this material would represent a very substantial cost item of the hydrocarbon conversion process and, therefore, many methods have been devised for recovering the aluminum halide content of the spent catalyst.

It is known that a large portion of the aluminum halide content of the spent catalyst complex may be recovered in anhydrous form by subjecting the spent catalyst complex to destructive distillation. One of the serious drawbacks of such a process is the formation of a solid carbonaceous material in the distillation vessel. Many methods have been developed for heating the catalyst complex without the formation of substantial coke deposits. Many of these recovery processes could be made more effective if a suitable means were available for more effectively and more cheaply spraying the highly viscous spent aluminum halide-hydrocarbon complex.

It is known in the art to introduce into the top of a distillation column an aluminum chloride-hydrocarbon complex, preheated to about 300–400° F., if desired, for downflow countercurrent to rising hot vapors and in said column to provide baffles for ensuring a large area of contact between the complex liquid and the vapors. Such a procedure is described in Patent 2,526,564 of October 17, 1950. A catalyst complex as described in said patent is a material to which this invention is applicable. It is also known to atomize aluminum chloride-hydrocarbon by use of a superheated gas, presumably methane, boiling point—161.5° C., into an aluminum chloride recovery chamber. The chamber is kept up to the subliming temperature of aluminum chloride, 177.8° C., 350.6° F. Such a process is described in Patent 1,426,081 of August 15, 1922.

The present invention is directed to a process for the formation of a suitable spray of aluminum halide-hydrocarbon complex, either as the fresh or spent catalytic material, with a conventional spray nozzle in processes including hydrocarbon conversion as well as catalyst recovery where the formation of an effective spray is desirable.

Thus, as noted above, and according to the process of our invention, the aluminum halide-hydrocarbon complex, particularly an aluminum chloride or aluminum bromide catalyst complex, is heated by methods well known in the art to a temperature in the approximate range of 500–650° F. at which the evolution of free hydrocarbons in the gas phase assists in the formation of a suitable spray with a conventional spray nozzle. The improvement in spraying is believed to be primarily due to the liberation of free hydrocarbons from the catalyst complex; however, the liberation of other gaseous constituents or materials from the complex may also contribute to the effectiveness of the spraying process. Heating of the catalyst complex obviously reduces somewhat the viscosity of the complex, but this reduction of viscosity is not sufficient for the formation of a good spray with a conventional spray nozzle at a temperature at which there is little evolution of free hydrocarbons. The admixture of an inert assist gas, such as nitrogen, does, however, permit the spraying of heated catalyst complex. At temperatures above about 650° F., the decomposition of the aluminum halide-hydrocarbon complex becomes very rapid necessitating the use of such short residence times that control of the heating is difficult, and temperatures above about 650° F. are not ordinarily to be employed for this reason.

The method of this invention may be advantageously applied for the spraying of a spent catalyst complex into a regeneration zone for regeneration, for example, according to the process set forth, described and claimed in Serial No. 319,045, fiied November 6, 1952, by James W. Tooke. The method of spraying catalysts according to this invention may also be used for introducing the catalyst complex into a reaction zone maintained under proper conditions. In view of the fact that some aluminum chloride-catalyzed reactions, such as alkylation, isomerization, and other hydrocarbon conversion reactions, are carried out at temperatures considerably below the range of 500–650° F., some provision may have to be made to maintain the reactor zone at the proper temperature by removal of the heat introduced by the sprayed catalyst complex.

*Example*

A spent aluminum chloride-hydrocarbon complex with a viscosity of 150 centistokes at 100° F. is not capable of being sprayed with a Monarch oil burner spray nozzle when the flow rate is at the rated capacity of the spray nozzle, 0.75 gal./hr., and the catalyst complex is heated to a temperature of about 400° F., where the viscosity is estimated to be about 5 centistokes. This oil burner nozzle is a simple swirl type spray nozzle and comprises two cones concentrically placed together to form a conical annulas between the surfaces of the two cones and with helices on the surface of the inner cone to impart a tangential component to the fluid passing through the annulas. The diameter of the orifice opening is 0.0030 inch. Although the reduction in viscosity of the spent aluminum chloride-hydrocarbon complex by raising the temperature is considerable, the reduction in viscosity is still not sufficient for spraying the catalyst complex with this spray nozzle. However, the admixture of a small amount of nitrogen with this heated spent aluminum chloride-hydrocarbon complex results in the formation of a very suitable spray with the Monarch spray nozzle. Upon increasing the temperature of the catalyst complex to approximately 550° F., where the evolution of free hydrocarbons takes place, a very suitable spray is developed with the Monarch spray nozzle without the addition of inert gas to the catalyst complex. This increase in temperature of the catalyst complex from 400° to 550° F. results in some additional reduction in viscosity; however, the reduction in viscosity in this temperature range is not very large and the enhancement in spraying is primarily the result of the release of free hydrocarbons in the catalyst complex.

Reasonable variation and modification are possible within the foregoing disclosure and the appended claims to the invention, the essence of which is that aluminum halide-hydrocarbon complex catalysts, particularly aluminum chloride and aluminum bromide catalyst complexes, can be effectively yet cheaply sprayed by heating the complexes to a temperature in the range 500–650° F. prior to discharge thereof through a conventional spraying means.

We claim:

1. A method for spraying an aluminum halide-hydrocarbon complex, overcoming difficulty ordinarily arising when spraying such a complex at a temperature even as high as 400° F., which comprises preheating said complex to a temperature in the approximate range of 500–650° F., then immediately spraying the same through a spraying means under anhydrous conditions, and recovering anhydrous aluminum halide.

2. A method for spraying an aluminum halide-hydrocarbon complex, overcoming difficulty when spraying such a complex at a temperature even as high as 400° F., said complex having a viscosity of 50–1500 centistokes at 100° F., which comprises preheating said complex to a temperature in the range of 500–650° F., then immediately spraying said complex at said temperature to which it has been heated through a spraying means under anhydrous conditions, and recovering anhydrous aluminum halide.

3. A method for spraying a spent aluminum halide-hydrocarbon complex, overcoming difficulty when spraying such a complex at a temperature even as high as 400° F., said complex containing from 50–70 weight percent aluminum halide and having a viscosity in the range of 50–1500 centistokes at 100° F., said complex also containing dissolved and suspended hydrocarbon which comprises heating said complex to a temperature in the range 500–650° F., then immediately spraying the same at said temperature to which it has been heated under anhydrous conditions, and recovering anhydrous aluminum halide.

4. A method for effecting the conversion of a hydrocarbon in the presence of an aluminum halide-hydrocarbon complex, overcoming difficulty encountered when spraying such a complex even at temperatures as high as 400° F., which comprises preheating said complex to a temperature in the range 500°–650° F. and then spraying said complex which has been heated into a reaction zone into contact with said hydrocarbon under anhydrous conditions, maintaining said hydrocarbon and complex under desired conversion conditions and recovering converted hydrocarbons.

5. A method according to claim 4 wherein the said complex is an aluminum chloride-hydrocarbon complex containing approximately 50–70 weight percent aluminum chloride and has a viscosity in the range of 50–1500 centistokes at 100° F.

6. A method for regenerating a spent aluminum halide-hydrocarbon complex catalyst in a regeneration zone, overcoming difficulty encountered when spraying such a complex at temperatures even as high as 400° F. which comprises preheating said catalyst to a temperature in the range 500–650° F., then immediately spraying the said catalyst into said regeneration zone under anhydrous conditions, and recovering anhydrous aluminum halide from said regeneration zone.

7. A method for spraying an aluminum halide-hydrocarbon complex, overcoming difficulty encountered when spraying such a complex at temperatures even as high as 400° F., which comprises preheating said complex to a temperature in the range of from about 500° F. to a temperature above which decomposition of the complex becomes very rapid, then spraying immediately the said complex at said temperature to which it has been preheated and under anhydrous conditions, and then recovering anhydrous aluminum halide.

8. A method of spraying an aluminum halide-hydrocarbon complex, overcoming difficulty encountered when spraying such a complex at a temperature even as high as 400° F. which comprises heating said complex to a temperature of at least about 400° F., admixing the thus heated complex with a gas inert at said temperature, then immediately spraying the said complex and recovering anhydrous aluminum halide.

References Cited in the file of this patent

UNITED STATES PATENTS

| | | |
|---|---|---|
| 1,865,797 | Shiffler | July 5, 1932 |
| 2,363,264 | Rosen | Nov. 1, 1944 |